(12) United States Patent
Grade et al.

(10) Patent No.: US 6,384,510 B1
(45) Date of Patent: May 7, 2002

(54) ELECTROSTATIC MICROACTUATOR WITH OFFSET AND/OR INCLINED COMB DRIVE FINGERS

(75) Inventors: John D. Grade, Mountain View; John H. Jerman, Palo Alto, both of CA (US)

(73) Assignee: Iolon, Inc., San Jose, CA (US)

( * ) Notice: Subject to any disclaimer, the term of this patent is extended or adjusted under 35 U.S.C. 154(b) by 0 days.

(21) Appl. No.: 09/547,698

(22) Filed: Apr. 12, 2000

Related U.S. Application Data (63) Continuation-in-part of application No. 09/464,361, filed on Dec. 15, 1999
(60) Provisional application No. 60/128,764, filed on Apr. 12, 1999, provisional application No. 60/123,512, filed on Mar. 8, 1999, provisional application No. 60/112,263, filed on Dec. 15, 1998, and provisional application No. 60/112,265, filed on Dec. 15, 1998.

(51) Int. Cl.$^7$ ................................................ H02N 1/00
(52) U.S. Cl. ...................................... 310/309; 310/309
(58) Field of Search ................................ 310/309, 308, 310/40 MM; 360/294.5, 294.2; 361/283.3

(56) References Cited

U.S. PATENT DOCUMENTS

| | | | |
|---|---|---|---|
| 5,025,346 A | 6/1991 | Tang et al. | 361/283 |
| 5,982,585 A | 11/1999 | Fan et al. | 360/104 |
| 5,998,906 A | 12/1999 | Jerman et al. | 310/309 |
| 6,133,670 A | * 10/2000 | Rodgers et al. | 310/309 |
| 6,211,599 B1 | * 4/2001 | Barnes et al. | 310/309 |

OTHER PUBLICATIONS

"Comb–drive actuators for large displacements", Rob Legtenberg, A. W. Groeneveld and M. Elwenspoek, pp. 320–329, Received Nov. 30, 1995, accepted for publication June 4, 1995. 0960–1317/96/030320 ©1996 IOP Publishing Ltd.

"Micromechanisms Using Sidewall Beams", Michael Warren Judy, 100 pages, Dissertation Submitted In Partial Satisfaction of the Requirements for the degree of Doctor of Philosophy in Engineering–Electrical Engineering and Computer Sciences in the Gradeuate Division of the University of California at Berkeley, ©1994.

"Large Displacement Linear Actuator", Reid A. Brennan, Martin G. Lim, Albert P. Pisano, Alan T. Chou, pp. 135–139, CH2783–9/90/0000–0135 ©1990 IEEE.

* cited by examiner

Primary Examiner—Nestor Ramirez
Assistant Examiner—Dang Dinh Le
(74) Attorney, Agent, or Firm—Flehr Hohbach Test Albritton & Herbert LLP (57) ABSTRACT

An electrostatic microactuator comprising a substrate and at least one comb drive assembly having a first comb member mounted on the substrate and a second comb member overlying the substrate. The first comb member has a plurality of first comb fingers. The second comb member has a plurality of second comb fingers. The second comb member is movable between a first position in which each second comb finger is not substantially fully interdigitated with an adjacent pair of first comb fingers and a second position in which each such second comb finger is substantially fully interdigitated with such adjacent pair of first comb fingers. Each of the second comb fingers is offset relative to the midpoint between the adjacent pair of first comb fingers when in the first position and is substantially centered on such midpoint when in the second position.

40 Claims, 5 Drawing Sheets

Fig. 8

ELECTROSTATIC MICROACTUATOR WITH OFFSET AND/OR INCLINED COMB DRIVE FINGERS

CROSS-REFERENCE TO RELATED APPLICATION

The application claims priority to U.S. provisional patent application Serial No. 60/128,764 filed Apr. 12, 1999 and is a continuation-in-part of copending U.S. patent application Ser. No. 09/464,361 filed Dec. 15, 1999 which claims priority to U.S. provisional patent application Serial No. 60/112,263 filed Dec. 15, 1998, U.S. provisional patent application Serial No. 60/112,265 filed Dec. 15, 1998 and U.S. provisional patent application Serial No. 60/123,512 filed Mar. 8, 1999, the entire content of each of which is incorporated herein by this reference.

SCOPE OF THE INVENTION

The present invention relates generally to electrostatic actuators and more particularly to electrostatic mnicroactuators with comb drive assemblies.

BACKGROUND

Electrostatic comb drive microactuators have heretofore been provided. See, for example, U.S. Pat. Nos. 5,025,346 and 5,998,906. Flexural suspensions for such microactuators have generally fallen into there categories: fixed-fixed beams, crab-leg flexures and folded flexures. For a discussion of these suspensions, see G. Legtenberg, et al., "Comb-Drive Actuators for Large Displacements", J. Micromech. Microeng. 6 (1996), pp 320–329. Folded flexures are further described in U.S. Pat. No. 5,025,346 and Michael Judy's U.C. Berkeley dissertation, "Mechanisms Using Sidewall Beams", 1994.

The maximum motion of electrostatic comb drive microactuators is often limited by electromechanical side instability forces which occur during interdigitation. In this regard, undesirable sidewise movement and possible snapover of the comb drive fingers can result from such side instability forces. Flexural suspensions can be utilized to discourage such sidewise movement. A discussion of this behavior, particularly with respect to fixed-fixed beams, crab- leg flexures and folded flexures, is set forth in the G. Legtenberg, et al. article cited above.

Several notable solutions for minimizing sidewise movement or snapover of comb drive fingers in linear electrostatic microactuators are set forth in U.S. Pat. No. 5,998,906. The linear comb drive assemblies described in the '906 Patent are disposed between first and second folded-beam suspensions, which enhance alignment of the comb drive fingers during deflection and thus minimize nonlinear travel of the comb drive fingers during deflection. Each of the folded-beam suspensions therein consists of a pair of beams connected in series. The pair of beams of each folded-beam suspension are connected at one end to a common bar. The opposite ends of such beams are connected either to a movable shuttle or to the fixed substrate. The compliance of a folded-beam suspension in the sideways direction results from two effects caused by the side load, namely individual beam extension or contraction in the sideways direction and beam distortion in the forward direction. The first term is mechanical and the second term is geometric. The stiffness of the suspension is the inverse of the compliance and thus the combination of the mechanical and geometric terms.

A nonfolded flexure suspension for an electrostatic actuator using parallel plate electrodes is described in R. Brennen, "Large Displacement Linear Actuator", 1990 technical digest of IEEE conference on Micro Electro-Mechanical Systems, pp 135–139. The suspension beams, connected by a shuttle, are initially inclined relative to the parallel plate electrodes by an angle of approximately five degrees. The load to the suspensions is applied normal to the shuttle. The motive force is produced by the increase in the projected length of the suspension beams, which reduces the electrostatic gap between the plates.

In general, it is an object of the present invention to provide an electrostatic microactuator having an improved suspension.

Another object of the invention is to provide an electrostatic microactuator of the above character having improved side stability.

Another object of the invention is to provide an electrostatic microactuator of the above character having a suspension that provides side stiffness to the comb drive fingers that is substantially independent of the forward deflection of the microactuator.

Another object of the invention is to provide an electrostatic microactuator of the above character having nonfolded suspension members.

Another object of the invention is to provide an electrostatic microactuator of the above character having reduced size and complexity.

Another object of the invention is to provide an electrostatic microactuator of the above character having a comb drive assembly with comb teeth that are inclined relative to the comb drive bar.

Another object of the invention is to provide an electrostatic microactuator of the above character having a comb drive assembly with movable comb teeth that are offset from the midpoint between the stationary comb teeth of the comb drive assembly.

SUMMARY OF THE INVENTION

The present invention provides an electrostatic microactuator comprising a substrate and at least one comb drive assembly having first and second comb drive members. The first comb drive member is mounted on the substrate and the second comb drive member overlies the substrate. At least one spring member is provided and has a first end portion secured to the substrate and a second end portion secured to the second comb drive member. The first comb drive member has a first elongate member and a plurality of spaced-apart first comb drive fingers extending from a side of the first elongate member with respective spaces therebetween. The second comb drive member has a second elongate member and a plurality of spaced-apart second comb drive fingers extending from a side of the second elongate member. The first comb drive member has a midpoint in the space between each adjacent pair of the first comb drive fingers. The second comb drive member is movable between a first position in which each second comb drive finger is not substantially fully interdigitated with an adjacent pair of first comb drive fingers and a second position in which each such second comb drive finger is substantially fully interdigitated with such adjacent pair of first comb drive fingers. Each of the second comb drive fingers is offset relative to the second elongate member from the midpoint between the adjacent pair of first comb drive fingers when in the first position and is substantially centered on such midpoint when in the second position.

BRIEF DESCRIPTION OF THE DRAWINGS

The accompanying drawings, which are somewhat schematic in many instances and are incorporated in and form a part of this specification, illustrate several embodiments of the invention and, together with the description, serve to explain the principles of the invention.

DESCRIPTION OF THE INVENTION

Figures 1, 2:
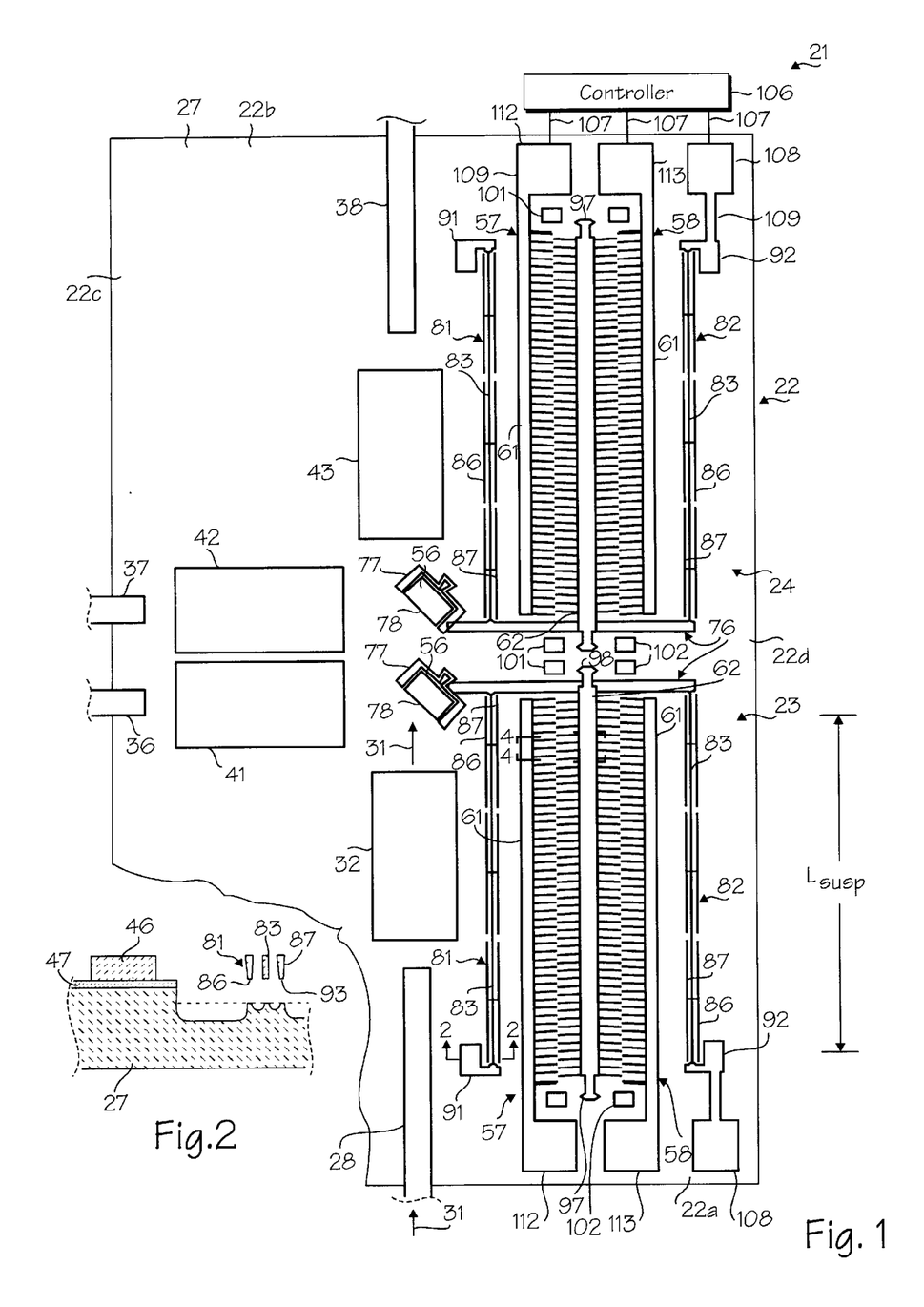
FIG. 1 is a plan view of an optical microswitch incorporating two linear electrostatic microactuators having offset and inclined comb drive fingers of the present invention.
FIG. 2 is a cross-sectional view of one of the linear electrostatic microactuator of FIG. 1 taken along the line 2—2 of FIG. 1.

The electrostatic microactuators of the present invention can be used in a variety of devices such as an optical microswitch. Exemplary optical microswitch 21 shown in FIG. 1 is a substantially planar device formed from a microchip 22 of any suitable size and shape. Miicrochip 22, shown in plan in FIG. 1, is rectangular in shape and has first and second opposite ends 22a and 22b and first and second opposite sides 22c and 22d. The microchip 22 has a length ranging from 1000 to 5000 microns and preferably approximately 2500 microns and a width ranging from 1000 to 5000 microns and preferably approximately 2000 microns. The microchip is formed from a base or substrate 27 made from any suitable material such as a silicon wafer.

At least one and as shown a plurality of two electrostatic microactuators in the form of first and second linear micromotors 23 and 24 are included in the optical microswitch 21 (see FIG. 1). At least one input optical fiber 28 is optionally provided for carrying input laser light 31 from a laser source (not shown) to the optical microswitch 21. Alternatively, input laser light or beam 31 can be supplied from any other suitable source, such as directly from a laser in close proximity to or mounted on substrate 27. The optional input fiber 28 can be mounted to substrate 27 at first end 22a of microchip 22 by an adhesive or any other suitable means. A conventional collimating lens such as GRIN lens 32 is disposed adjacent the end of input fiber 28 and is secured to substrate 27 by an adhesive or other suitable means. The GRIN lens 32 directs input light 31 along a linear path extending along the longitudinal axis of optical microswitch 21.

At least one and as shown a plurality of three output optical fibers are provided in optical microswitch 21, as shown in FIG. 1. First and second output fibers 36 and 37 are disposed along first side 22c of microswitch 21 for receiving laser light 31 reflected 90 degrees from the longitudinal axis of microswitch 21. A third output fiber 38 is disposed on second end 22b of the microchip. Output fibers 36–38 can optionally be mounted to substrate 27 by an adhesive or any other suitable means Conventional collimating lens such as GRIN lenses 41–43 are disposed near the respective ends of optical fibers 36–38 and mounted to substrate 27 in the same manner as the output fibers. GRIN lens 43 is linearly aligned with input GRIN lens 32, while GRIN lenses 41 and 42 are aligned side by side and parallel to each other but perpendicular to GRIN lenses 32 and 43. The end surfaces of optical fibers 28 and 36–38 and GRIN lenses 32 and 41–43 are coated in a conventional manner with an anti-reflective material.

Substrate 27 is made from any suitable material such as silicon and is preferably formed from a silicon wafer. The substrate has a thickness ranging from 200 to 600 microns and preferably approximately 400 microns. First and second linear micromotors 23 and 24 are formed atop the substrate 27 by a second or top layer 46 made from a wafer of any suitable material such as silicon (see FIG. 2). Top wafer 46 has a thickness ranging from 10 to 200 microns and preferably approximately 85 microns and is secured at certain points to the substrate 27 by a suitable means. The top wafer 46 is preferably fusion bonded to the substrate 27 by a silicon dioxide layer 47 having a thickness ranging from 0.1 to two microns and preferably approximately one micron. Top layer 46 may be lapped and polished to the desired thickness.

Figure 3:
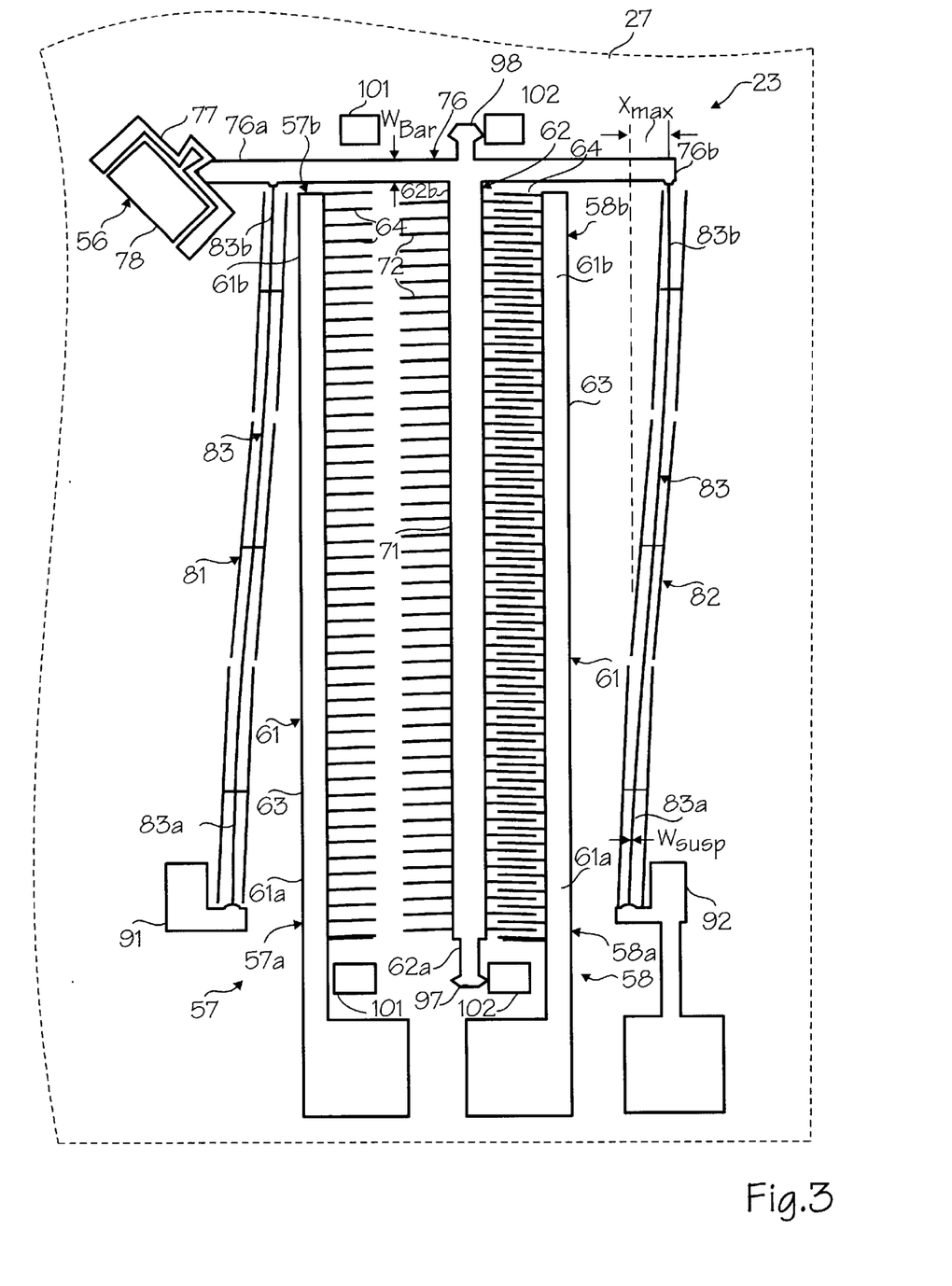
FIG. 3 is a plan view of one of the linear electrostatic microactuators of FIG. 1 in a second position.

First and second micromotors 23 and 24 are substantially identical in construction (see FIG. 1). Each of the micromotors includes a micromirror 56 and at least one comb drive assembly. Preferably, each of the micromotors 23 and 24 includes at least one first comb drive assembly 57 for extending the respective micromirror 56 towards one of output lenses 42 and 43 and thus further into the path of input laser light 31 launched from input lens 32 and at least one second comb drive assembly 58 for retracting the respective micromirror 56 in an opposite direction out of the path of input laser light 31. As shown in FIG. 3, first comb drive assembly 57 has opposite first and second extremities 57a and 57b and second comb drive assembly 58 has opposite first and second extremities 58a and 58b. Each of the comb drive assemblies 57 and 58 has a length between its extremities ranging from 100 to 5000 microns and preferably approximately 1000 microns.

First comb drive assembly 57 includes a first drive member or comb drive 61 formed from the top wafer 46 and secured to substrate 27 by silicon dioxide layer 47 (see FIGS. 1 and 2). The first comb drive 61 has first and second opposite end portions 61a and 61b corresponding to first and second extremities 57a and 57b of the comb drive assembly. The first comb drive assembly 57 further includes a second comb drive member or comb drive 62 formed from top wafer 46 and overlying substrate 27. The second comb drive 62 has opposite first and second end portions 62a and 62b corresponding to first and second extremities 57a and 57b of the comb drive assembly.

First comb drive 61 includes an elongate member or bar 63 and a plurality of comb drive teeth or fingers 64 secured to one side of the spine or bar 63 and extending towards the second comb drive 62 (see FIGS. 1 and 3). The first comb drive fingers 64, shown as being linear, have a length ranging from five to 200 microns and preferably approximately 80 microns and preferably have a constant width along their length, which width can range from two to 15 microns and is preferably approximately five microns. The first comb drive fingers 64 are longitudinally spaced apart along the length of bar 63 at a separation distance ranging from six to 50 microns and preferably approximately 25 microns. Each adjacent pair for first comb drive fingers 64 has a space 66 therebetween, as shown most clearly in FIGS. 4 and 5, and a midpoint between the comb drive fingers 64 shown in such figures by midpoint line 67. Comb drive fingers 64 are joined to first bar 63 at an oblique angle, which inclination angle can range from zero to five degrees and is preferably approximately three degrees. The first comb drive fingers 64 are inclined at such angle towards second end portion 61*b* of the first comb drive assembly 57.

Second comb drive 62 is similar in construction to the first comb drive 61, as shown in FIG. 1. Specifically, second comb drive 62 includes a second elongate member or bar 71 extending substantially parallel to first bar 63. A plurality of second comb drive teeth or fingers 72 are secured to one side of the spine or bar 71 in longitudinally spaced-apart positions along the length of the bar and extend towards the first comb drive 61. Each of the second comb drive fingers, shown as being linear, has a length and a constant width along its length. The second comb drive fingers 72 can be of any suitable length and width and preferably have a length and width corresponding to the length and width of first comb drive fingers 64. Each of the second comb drive fingers 72 is joined to second bar 71 at an oblique angle corresponding to the angle at which first comb drive fingers 64 are joined to first bar 63. The second comb drive fingers 72 are each inclined at such oblique angle towards first extremity 57*a* of the first comb drive assembly 57.

Figure 4:
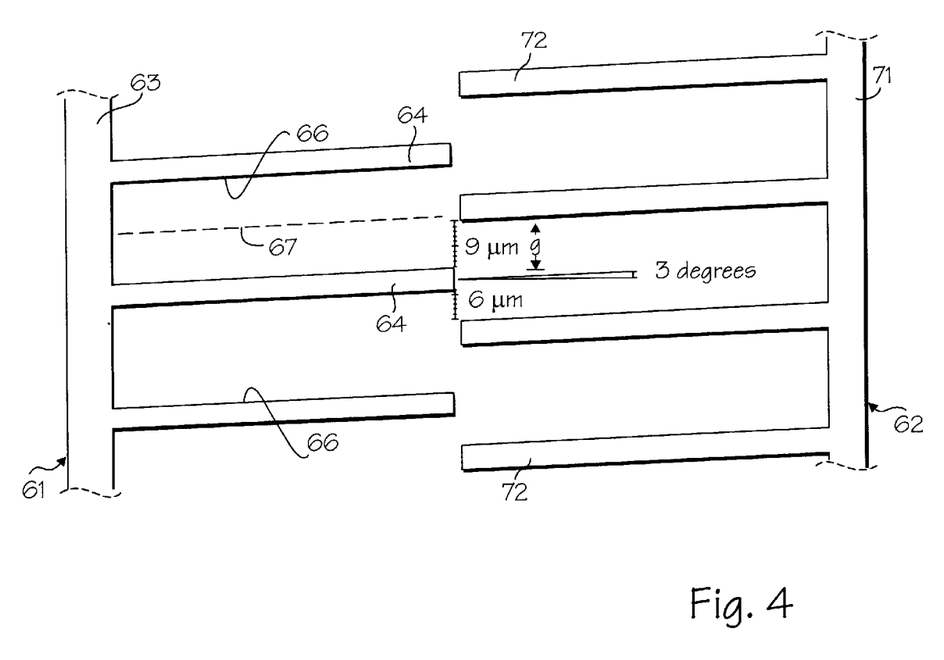
FIG. 4 is an enlarged plan view, taken in the section 4—4 of FIG. 1 and exaggerated in certain respects, of a portion of one of the linear electrostatic microactuators of FIG. 1 in which the offset and inclined comb drive fingers are in a disengaged position.

When in its rest position, as shown in FIG. 1, each of second comb drive fingers 72 is offset relative to second bar 71 from the midpoint line 67 between the adjacent pair of first comb drive fingers between which the second comb drive finger interdigitates when second comb drive 62 is electrostatically attracted to first comb drive 61. The offset of second comb drive fingers 72 can range from zero to two microns and is preferably approximately 0.75 microns in the illustrated embodiment. Second comb drive fingers 72 are shown in FIG. 4 as being spaced apart by an exaggerated gap of approximately nine microns from one of the adjacent first comb drive fingers 64 and six microns from the other of the adjacent first comb drive fingers 64. Thus, each second comb drive finger 72 is offset a distance of approximately 1.5 microns from midpoint line 67 when in its rest position in the exaggerated drawings in FIGS. 4 and 5. The offset of the comb drive fingers in FIGS. 4 and 5 has been exaggerated to facilitate the visualization and understanding thereof.

Second comb drive assembly 58 is substantially identical to first comb drive assembly 57 and includes a first comb drive 61 and a second comb drive 62 (see FIGS. 1 and 3). The first bar 63 of second comb drive assembly 58 is spaced apart and parallel to the first bar 63 of first comb drive assembly 57. The second bar 71 of first comb drive assembly 57 is shared with the second comb drive assembly 58. Thus, second comb drive fingers 72 of first comb drive assembly 57 extend from one side of the second bar 71 and second comb drive fingers 72 of second comb drive assembly 58 extend from the other side of the second bar 71. The double-sided second comb drive 62 shared by first and second comb drive assemblies 57 and 58 is disposed between the first comb drives 61 of first and second comb drive assemblies 57 and 58.

Comb drive second end portion 62*b* of first and second comb drive assemblies 57 and 58 is perpendicularly joined to an elongate, linear shuttle member or shuttle 76 formed from top wafer 46 and overlying substrate 27. Shuttle 76 has a first or front end portion 76*a* and an opposite second or rear end portion 76*b* and a width ranging from 10 to 60 microns and preferably approximately 35 microns. A micromachined mirror holder or bracket 77 is joined to front end portion 76*a* of the shuttle 76 and is preferably formed integral with the shuttle 76. Micromirror 56 is secured to brackets 77 in any suitable manner such as an adhesive (not shown) and can be of any suitable type such as disclosed in U.S. Pat. No. 5,998,906, the entire content of which is incorporated herein by this referenced. Micromirror 56 has a reflective face 78 inclined at an oblique angle to the longitudinal axis of shuttle 76 and preferably disposed at a 45 degree angle to the shuttle. Mirror face 78 is thus disposed at a 45 degree angle relative to input laser light 31 launched from GRIN lens 32.

At least one spring member or suspension is included in each of the first and second linear micromotors 23 and 24 for supporting the respective first and second comb drive assemblies 57 and 58 and shuttle 76 above substrate 27 so as to permit movement of the second comb drives 62 relative to the first comb drives 61. More specifically, first and second spaced apart suspensions 81 and 82 are included in each of the micromotors, as shown in FIGS. 1 and 3. Each of the suspensions has a length approximating the length of first and second comb drive assemblies 57 and 58 and preferably has a length ranging from 100 to 5000 microns and more preferably approximately 1000 microns. Although the suspensions 81 and 82 can be of any suitable construction, each of the suspensions has an elongate beam-like member or flexural beam 83 provided with opposite first and second end portions 83*a* and 83*b*. The flexural beam 83 has a rectangular cross section, as shown in FIG. 2, and a width ranging from one to ten microns and preferably approximately four microns. First and second thin, elongate sacrificial bars 86 and 87, each of a type described in U.S. Pat. No. 5,998,906, are provided for each flexural beam 83 to enhance even etching and thus the formation of the desired cross section of the flexural beam 83. Sacrificial bars 86 and 87 extend parallel to the respective flexural beam 83 and are spaced apart on opposite sides of the beam.

The axial stiffness of each suspension 81 and 82, that is each flexural beam 83 thereof, is represented only by a mechanical term and is represented by the following equation:

$$k_y = Ewh/L,$$

where E is Young's modulus and w, h and L are the width, height and length of flexural beam 83.

First and second comb drive assemblies 57 and 58 are disposed between first and second suspensions 81 and 82. As shown in FIG. 1, first suspension 81 is spaced apart from the outside from first comb drive 61 of first comb drive assembly 57. Second suspension 82 is spaced-apart from the outside of the first comb drive 61 of second comb drive assembly 58. Suspensions 81 and 82 extend parallel to first and second comb drive assemblies 57 and 58 when in their respective at rest positions shown in FIG. 1. The first end portion 83*a* of each beam member 83 is secured to substrate 27 in the vicinity of the first extremity of the respective first comb drive assembly 57 or second comb drive assembly 58. The second end portion 83*b* of each beam member 83 is secured to the second end portion 62*b* of the respective second comb drive 62, by means of shuttle 76, in the vicinity of the second extremity of the respective first or second comb drive assembly. A first attachment block or anchor 91, formed from top wafer 46 and secured to substrate 27 by silicon dioxide layer 47, is provided for so securing first suspension 81 to the substrate and a second attachment block or anchor 92, similar in construction to the first anchor, is provided for so securing the second suspension 82 to the substrate.

The second comb drive 62 of first and second comb drive assemblies 57 and 58, shuttle 76 and first and second suspensions 81 and 82 are spaced above substrate 27 by an air gap 93, shown in FIG. 2 with respect to first suspension 81, so as to be electrically isolated and moveable relative to the substrate. These structures can have any suitable thickness or height and preferably have a thickness ranging from 10 to 200 microns and more preferably approximately 85 microns. Each of such structures are formed from top wafer 46 and are preferably etched from the wafer 46 using high aspect ratio processes such as deep reactive ion etching (DRIE) techniques so as to provide the structures with relatively great out-of-plane stiffness for substantially constraining motion to that in the plane of wafer 46. Plated metal processes such as the LIGA process can also be utilized in forming such structures.

Second comb drive 62 of each of first and second comb drive assemblies 57 and 58 is movable between a first position, in which first and second comb drive fingers 64 and 72 are not substantially fully interdigitated, and a second position in which the first and second comb drive fingers 64 and 72 are substantially fully interdigitated. As used herein, not fully substantially interdigitated includes positions when first and second comb drive fingers 64 and 72 are spaced apart or only slightly interdigitated, as shown in FIG. 1 with respect to both comb drive assemblies 57 and 58 and in FIG. 3 with respect to first comb drive assembly 57, or when the comb drive fingers 64 and 72 are only partially interdigitated. As used herein, substantially fully interdigitated includes positions when first and second comb drive fingers 64 and 72 are more interdigitated than when not substantially interdigitated, and particularly includes positions when the comb drive fingers 64 and 72 are fully interdigitated, as shown in FIG. 3 with respect to second comb drive assembly 58.

Figure 5:
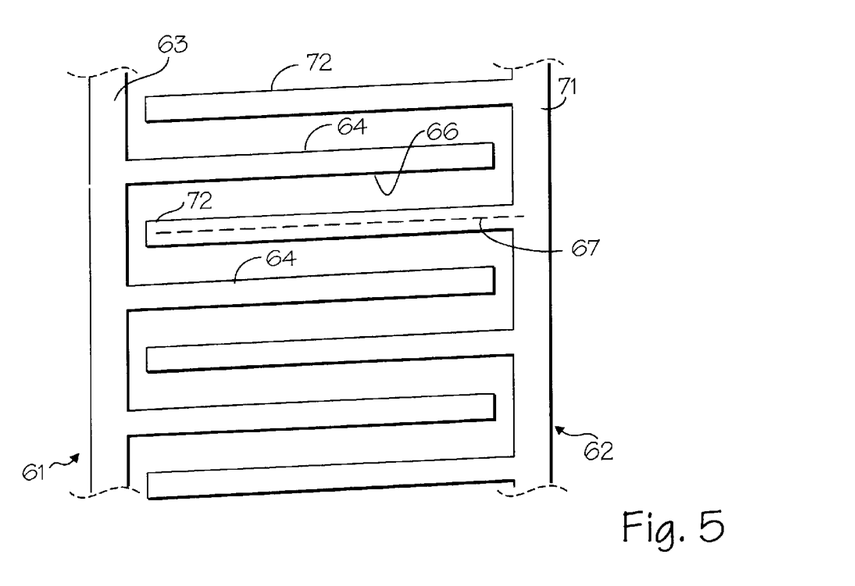
FIG. 5 is an enlarged plan view, similar to FIG. 4 and exaggerated in certain respects, of a portion of one of the linear electrostatic microactuators of FIG. 1 in which the offset and inclined comb drive fingers are in an engaged position.

Each of the second comb drive fingers 72 is substantially centered on the midpoint line 67 between the adjacent first comb drive fingers 62 when the second comb drive 62 is substantially fully interdigitated with the first comb drive 61, as shown in FIG. 5. Although the second comb drive fingers 72 are shown as being centered on line 67 in FIG. 5, the invention is broad enough to cover comb drive assemblies where the second comb drive fingers 72 are centered on line 67 slightly before fall interdigitation and thus move past line 67 at fall interdigitation. Comb drive fingers 72 which approach but do not actually center on line 67 at fully interdigitation are also contemplated herein.

When the micromotor 23 or 24 is in its rest position, as shown in FIG. 1, the second comb drive fingers 72 of each of first and second comb drive assemblies 57 and 58 are not substantially fully interdigitated with the respect to the first comb drive fingers 64. Movement of the second comb drive 62 of first comb drive assembly 57 in a first direction substantially perpendicular to second bar 71 results in first and second comb drive fingers 64 and 72 of such comb drive assembly becoming substantially fully interdigitated (not shown) and micromirror 56 moving to a fully extended position. Movement of second comb drive 62 of second comb drive assembly 58 in an opposite direction substantially perpendicular to second bar 71 results in first and second comb drive fingers 64 and 72 of the second comb drive assembly becoming substantially fully interdigitated, as shown in PIG. 3 with respect to first micromotor 23, and the micromirror 56 moving to a fully retracted position.

Figure 6:
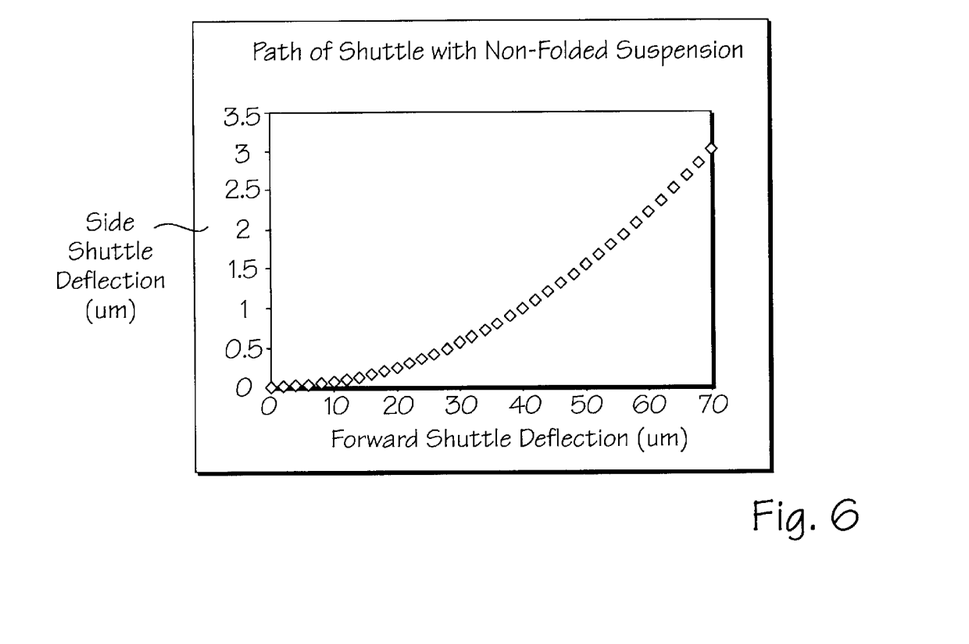
FIG. 6 is a graph depicting the side deflection of a shuttle with nonfolded suspensions as a function of the shuttle path.

Shuttle 76 and second comb drive fingers 72 do not move along a straight line as the shuttle moves from its fully retracted position, shown in FIG. 3, to its fully extended position (not shown). The curvature induced shortening of 81 and 82 results in the shuttle 76 moving along a shallow curve approximated by the formula $$y(x)=\pi^2 x^2/16L,$$

where the x axis extends parallel to the linear shuttle 76, the y axis extends towards the first extremities of comb drive assemblies 57 and 58 and L refers to the length of flexural beam 83. The path of a shuttle 76 where flexural beams 83 have a length of one millimeter is shown in FIG. 6. As first and second suspensions 81 and 82 bend, the second comb drives 62 of the first and second comb drive assemblies 57 and 58 are pulled by the suspensions towards the respective first extremities 57a and 58a of the comb drive assemblies. As such, the second comb drive fingers 72 of first and second comb drive assemblies 57 and 58 travel through an arcuate or parabolic path as second bar 71 moves between a fully retracted position in which the first and second comb drive fingers of second comb drive assembly 58 are fully interdigitated and a fully extended position in which the first and second comb drive fingers of first comb drive assembly 57 are fully interdigitated.

The curved path of shuttle 76 would result in a traditional comb drive finger, oriented along the direction of travel and not offset from the midpoint between the stationary comb drive fingers, having a three micron side deflection resulting in a six micron difference in electrostatic gap after 70 microns of forward travel. Such a differential in electrostatic gap would produce a significant force imbalance and probably cause the comb drive fingers to snap over.

Figure 7:
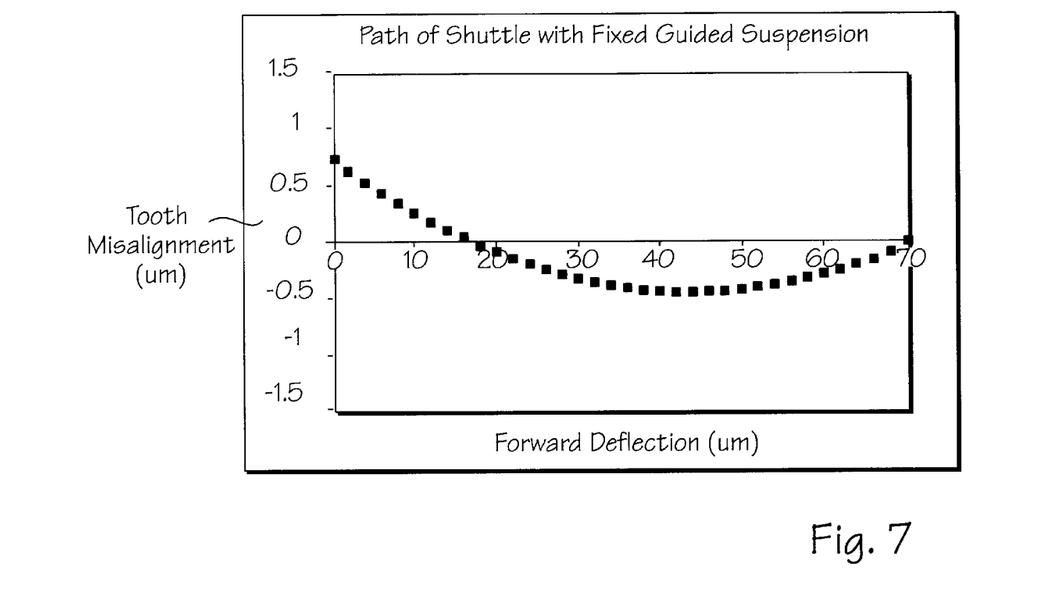
FIG. 7 is a graph depicting the comb tooth misalignment in a microactuator having a comb drive assembly with offset and inclined comb teeth as a function of the path of the shuttle.
Figure 8:
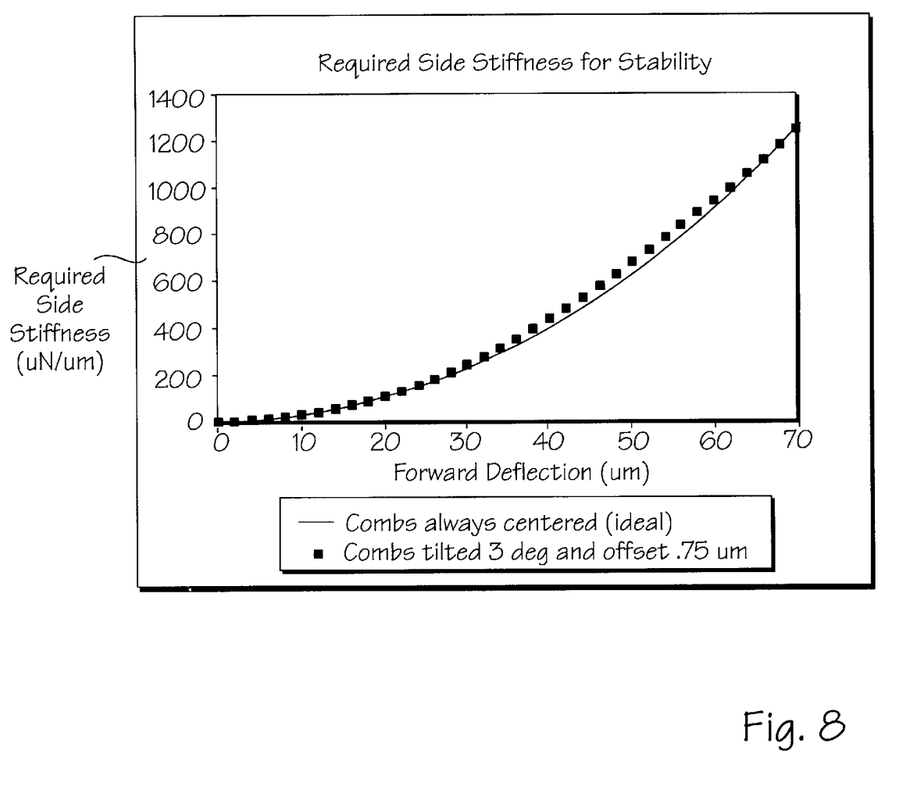
FIG. 8 is a graph depicting the required side stiffness in a microactuator having a comb drive assembly with offset and inclined comb teeth as a function of the required side stiffness for stability of such comb drive assembly.

Side instability between comb drive fingers occurs when the derivative of the net side forces becomes positive, that is when the negative feedback of the forces from suspensions 81 and 82b becomes smaller than the positive feedback of the electrostatic forces between comb drive fingers 64 and 72. Therefore, stability requires that $$NhxV^2\left(\frac{\varepsilon}{(g-y)^3} + \frac{\varepsilon}{(g+y)^3}\right) < k_y$$

where N is the number of comb drive fingers 72 in the comb drive assemblies 57 and 58, h is the thickness or depth of the comb drive fingers 72, V is the drive voltage, $\varepsilon$ is the free space dielectric constant, y is the comb misalignment and $k_y$ is the side suspension stiffness. Utilizing the above equation, the misalignment, y, of comb drive fingers 72 relative to comb drive fingers 64 is comprised of the arcuate or parabolic path of shuttle 76 and the initial inclination and offset of the comb drive fingers and is represented by the equation $$y=(\pi^2 x^2/16L)+mx+b,$$

where m is the inclination of the comb drive fingers and b is the initial offset of the comb fingers. The values of m and b may be chosen to maximize stability by minimizing the derivative of the net side force over the forward deflection range. The graphs in FIGS. 7 and 8 show the path of shuttle 76 and the required side stiffness for stability where first and second comb drive fingers 64 and 72 are inclined at an angle of three degrees and the second comb drive fingers 72 are provided with an initial offset of 0.75 microns.

Means is optionally included within each of the first and second micromotors 23 and 24 for limiting the movement of second comb drives 62 in each of the opposite first and second directions. In this regard, opposite first and second stubs 97 and 98 extend from respective first and second end portions 62a and 62b of second bar 71. A stop block 101 formed from top wafer 46 is secured to substrate 22 by layer 47 at each end of comb drive assembly 57 for limiting the interdigitation of the second comb drive fingers 72 with the first comb drive fingers 64 of the first comb drive assembly. A similar second stop 102 is secured to substrate 27 at each end of second comb drive assembly 58 for limiting the interdigitation of the second comb drive fingers 72 with the first comb drive fingers 64 of second comb drive assembly 58.

Electrical means is included within optical microswitch 21 for driving the second comb drives 62 of each of the first and second micromotors 23 and 24 in the opposite first and second directions. Such electrical means includes a controller and voltage generator 106 that is electrically connected by means of a plurality of electrical leads 107 to a plurality of electrodes provided on substrate 27. Each of the micromotors 23 and 24 has a first or ground or common electrode 108 joined to second anchor 92 by a trace 109 for grounding first and second suspensions 81 and 82, shuttle 76 and second comb drives 62. A second or drive electrode 112 is electrically connected by a trace 109 to first end portion 61 of first comb drive assembly 57 for providing an electrical potential to first comb drive 61 of the comb drive assembly 57. A similar third or drive electrode 113 is connected by means of a trace 109 to first end portion 61a of the second comb drive assembly 58 for providing an electrical potential to the first comb drive 61 of the second comb drive assembly 58. Electrodes 108, 112 and 113 and traces 109 are each formed from top wafer 46 and secured to substrate 27 by means of silicon dioxide layer 47. A metal layer (not shown) of aluminum or any other suitable material is created on the portion of the top surface of wafer 36 forming electrodes 108, 112 and 113 and traces 109 for facilitating the creation of such electrodes and traces. Electrodes 108, 112 and 113 are advantageously placed along one of the ends or sides of microchip 22 so as to facilitate access to the electrodes by leads 107. As shown, the electrodes for first micromotor 23 are placed along first side 22a of the microswitch 21 and the electrodes for second micromotor 24 are placed along the second side 22b of the microswitch. For simplicity, controller 106 is shown in FIG. 1 as being electrically coupled only to electrodes 108, 112 and 113 of second micromotor 24.

The design of each micromotor Is defined by five dimension, namely, the length and width of flexural beams 83 as identified respectively by the letters $L_{susp}$ in FIG. 1 and the letters $W_{susp}$ in FIG. 3, the maximum forward travel of each of first and second comb drive assemblies as identified by the letters $X_{max}$ in FIG. 3 with respect to the second comb drive assembly 58, the gap between comb drive fingers 64 and 72 as identified by the letter g in FIG. 4 and the width of shuttle 76 as identified by the letters $W_{bar.}$ in FIG. 3. When $X_{max}$ is set, $W_{bar.}$ is chosen to achieve sufficient stiffness while minimizing mass. The length of shuttle 76 is equal to approximately:

$$(4*X_{max})+(3*W_{bar.}),$$

$W_{susp}$ is set to the minimum line width of the fabrication process and $L_{susp}$ is chosen to satisfy the resonant frequency and drive voltage constraints. The electrostatic gap between comb drive fingers 64 and 72 is determined by the choice of suspension length $L_{susp}$.

First and second linear micromotors 23 and 24 are disposed end to end adjacent second side 22b of microchip 22. The shuttles 76 and micromirrors 56 of the micromotors 23 and 24 are disposed adjacent to each other so as to desirably limit the path length of input laser light 31 within optical microswitch 21. Means in the form of a closed looped servo control can be included in optical microswitch 21 for monitoring the position of the second comb drives 62 of each of first and second micromotors 23 and 24 and thus the position of micromirrors 56 within the microswitch 21. For example, controller 106 can determine the position of a movable comb drive 62 by means of a conventional algorithm included in the controller for measuring the capacitance between the second comb drive fingers 72 of the movable comb drive 62 and the first comb drive fingers 64 of the related stationary comb drive 61. A signal separate from the drive signal to the respective comb drive assembly 57 and 58 can be transmitted by controller 106 to the micromotor for measuring such capacitance.

In operation and use, optical microswitch 21 is particularly suited for use in a fiber-optic network of a telecommunications system for directing laser light to one of the three output fibers 36–38. Micromirror 36 of first linear micromotor 23 can be moved by the first and second comb drive assemblies 57 and 58 of such micromotor from a first or retracted position out of the path of input laser light 31 to a second or extended position into such path for directing light 31 at a 90 degree angle into GRIN lens 41 for output via first output fiber 36. When micromirror 56 of first micromotor 23 is in its retracted position, micromirror 56 of second micromotor 24 can be similarly utilized for directing laser light 31 at a 90 degree angle into GRIN lens 42 for output via second output fiber 37. When the micromirrors 56 of both first and second micromotors 23 and 24 are in a retracted position, the laser light 31 continues in its linear path to GRIN lens 43 and third output fiber 38.

When it is desired to move micromirror 56 of one of first and second micromotors 23 and 24 from its home position shown in FIG. 1, suitable voltage potentials can be supplied by controller 106 to first and second comb drive assemblies 57 and 58 in any suitable procedure such as described in U.S. Pat. No. 5,998,906. In one exemplary procedure, micromirror 56 can be retracted by supplying a voltage potential to first comb drive 61 of second comb drive assembly 58 so as to cause second comb drive fingers 72 of such comb drive assembly to be electrostatically attracted to first comb drive fingers 64 of the related first comb drive 61. Such attraction force causes the second comb drive fingers 72 to move towards and interdigitate with the first comb drive fingers 64. The amount of such interdigitation, and thus the amount of retraction of the micromirror 56, can be controlled by the amount of voltage supplied to the first comb drive 61 of second comb drive assembly 58. When it is desired to move the micromirror 56 from its rest position to a position where the mirror is further extended into the path of input light 31, a suitable voltage potential is supplied by the controller 106 to the first comb drive 61 of first comb drive assembly 57 to cause second comb drive fingers 72 of such comb drive assembly to move towards and interdigitate with the first comb drive fingers 64 of the first comb drive assembly. Suitable voltage potentials to first and second comb drive assemblies 57 and 58 can range from 20 to 300 volts and preferably range from 70 to 140 volts.

Micromirror 56 of each of the first and second micromotors 23 and 24 is capable of extension or retraction from its rest position shown in FIG. 1 of approximately 70 microns, for an aggregate travel between its fully retracted position to its fully extended position of approximately 140 microns. The amount of travel is dependent in part on the number of comb drive fingers 64 and 72, the gap between the comb drive fingers and the length and width of the first and second suspensions 81 and 82.

In an alternative electrical drive configuration for electrostatic microactuators 23 or 24, controller 106 applies a ground potential to electrode 112 coupled to first comb drive 61 of first comb drive assembly 57 and a fixed maximum potential to electrode 113 coupled to first comb drive 61 of second comb drive assembly 58. A variable potential between the ground potential and the fixed maximum potential is applied by the controller to common electrode 108 coupled to second anchor 92 and hence second comb drives 62. When the potential applied to common electrode 108 is equal to half of the maximum potential, an equal potential difference exists between electrodes 113 and 108 and between electrodes 112 and 108 resulting in approximately equal forces tending to move micromirror 56 in forward and rearward directions and thus resulting in no movement of the micromirror 56. As the drive voltage applied to common electrode 108 is varied from this half value, an increasing net force is provided which results in movement of the micromirror 56 from its rest position of FIG. 1. When the applied potential to common electrode 108 is at either ground or the fixed maximum value, a maximum force substantially equal to the drive force that occurs when a similar maximum drive voltage is applied to either electrode 113 or 112 and common electrode 108 is grounded is then applied so as to cause movement of micromirror 56. Specifically, when the common electrode is grounded, the micromirror 56 retracts; when the common electrode is provided with the fixed maximum value, the micromirror 56 extends. Similar voltages to those discussed above can be applied and similar travel distances can be achieved. This alternative drive configuration requires only a single variable potential source and smoothly varies the position of micromirror 56 with optical microswitch 21 by varying only a single source. The number of electrical components in controller 106 and thus the cost of the actuator system can be reduced with this drive configuration.

Single, nonfolded beams 83 contribute to the relatively large travel distances of micromirrors 56 by providing a relatively large suspension stiffness to first and second suspensions 81 and 82. Sideways movement of the suspensions, resulting from forward or rearward movement of shuttle 76, produces only a small deflection in the second comb drive fingers 72 of the advancing comb drive 62 that is mostly forward and only slightly sideways relative to the first comb drive fingers 64 into which the second comb drive fingers 72 are interdigitating. Thus, such side loads on the suspensions 81 and 82 cause the shuttle 76 and second comb drive fingers 72 to move along essentially the same path as the shuttle and comb drive fingers 72 travel when forward loads are exerted on the shuttle. The increase in side stability forces provided by beams 83 provides micromotors 23 and 24 with a significant improvement in performance, either in switching speed or drive voltage.

The offset and inclined comb drive fingers of first and second comb drive assemblies contribute to the stability of the first and second micromotors 23 and 24. The offset alignment of second comb drive fingers 72 relative to first comb drive fingers 64 ensures that the second comb drive fingers 72 will be substantially centered on midpoint line 67, as shown in FIG. 5, when the first and second comb drive fingers are fully interdigitated. Since the comb drive fingers 72 are substantially centered, the derivative of the net side force is substantially minimized and the side stability is maximized at the fully interdigitated position.

The complimentary inclination of first and second comb drive fingers 64 and 72 further minimizes side instability of the first and second comb drive assemblies 57 and 58. As discussed above, first comb drive fingers 64 are inclined toward the second extremity of the respective first and second comb drive assemblies 57 and 58 and second comb drive fingers 72 are inclined at an equal angle towards the first extremity of the respective first and second comb drive assembly. The cooperative inclination of the first and second comb drive fingers contributes to each second comb drive finger 72 being more centered relative to the respective pair of adjacent first comb drive fingers 64 during interdigitation of the first and second comb drive fingers 64 and 72. Since the comb drive fingers remain more centered, the side stability is maximized during interdigitation. The combination of initial offset and inclination allows the side stability to be maximized throughout the fall deflection range. It should be appreciated that the invention is broad enough to cover microactuators having comb drive assemblies with comb drive fingers that are offset but not inclined, inclined but not offset or not offset or inclined.

Optical microswitch 21 is relatively compact in design. In this regard, first and second micromotors 23 and 24 are piggy-backed together in an end-to-end configuration to advantageously place the two micromirrors 56 close together in the optical microswitch 21. The electrodes 108, 112 and 113 for electrically accessing the micromotors are disposed along edges of the microchip 22 to eliminate spacial requirements otherwise required by the threading of electrical leads between adjacent micromotors. The nonfolded suspensions 81 and 82 require less surface area for deflection than folded springs and thus permit more surface area to be allocated to comb drive assemblies 57 and 58 in the micromotors of optical microswitch 21.

Although optical microswitch 21 has been disclosed for use in a fiber-optic network of a telecommunications system, it should be appreciated that the microswitch can be used in other applications within the scope of the invention. For example, the microswitch 21 can be used in an optical data storage system of the type disclosed in copending U.S. Pat. Application Ser. No. 09/135,236 filed Aug. 17, 1998 and in optical scanners, optical spectrometers and optical phase compensators. It should also be appreciated that microswitch 21 can be bidirectional or unidirectional in another direction from that described above. For example, any of optical fibers 36–38 can be utilized as an input fiber and optical fiber 28 can be utilized as an output fiber. In addition, it is contemplated that micromotors 23 and 24 can have applications other than in an optical switch. For example, micromotors 23 and 24 can be used to rotate or translate components such a& optical waveplates and diffraction gratings. The various features of first and second comb drive assemblies 57 and 58, including the offset and inclined comb drive fingers 64 and 72 thereof, can also be incorporated into other micoactuators such as rotary electrostatic microactuators, including the type disclosed copending U.S. patent application Ser. No. 09/464,361 filed Dec. 15, 1999, the entire content of which is incorporated herein by this reference.

As can be seen from the foregoing, an electrostatic microactuator having an improved suspension has been provided. The microactuator has improved side stability and includes a suspension that provides side stiffness to the comb drive fingers that is substantially independent of the forward deflection of the microactuator. The microactuator has nonfolded suspension members and is of a reduced size and complexity. It can be provided with a comb drive assembly having comb teeth that are inclined relative to the comb drive bar. The comb drive assembly of the microactuator can further include movable comb teeth that are offset from the midpoint between the stationary comb teeth of the comb drive assembly.

What is claimed is:

1. An electrostatic microactuator comprising a substrate, at least one comb drive assembly having first and second comb drive members, the first comb drive member being mounted on the substrate and the second comb dive member overlying the substrate, at least one spring member having a first end portion coupled to the substrate and a second end portion coupled to the second comb drive member, the first comb drive member having a first elongate member and a plurality of spaced-apart first comb drive fingers extending from a side of the first elongate member with respective spaces therebetween, the second comb drive member having a second elongate member and a plurality of spaced-apart second comb drive fingers extending from a side of the second elongate member, the first comb drive member having a midpoint in the space between each adjacent pair of the first comb drive fingers, the second comb drive member being movable between a first position in which each second comb drive finger is not substantially fully interdigitated with an adjacent pair of first comb drive fingers and a second position in which each such second comb drive finger is substantially fully interdigitated with such adjacent pair of first comb drive fingers, each of the second comb drive fingers being offset relative to the second elongate member from the midpoint between the adjacent pair of first comb drive fingers when in the first position and being substantially centered on such midpoint when in the second position.

2. A microactuator as in claim 1 wherein the at least one spring member comprises first and second beam-like spring members, the at least one comb drive assembly being disposed between the first and second beam-like spring members.

3. A microactuator as in claim 1 wherein the at least one comb drive assembly has first and second extremities and wherein the at least one spring member is a single beam-like member having a first end portion coupled to the substrate in the vicinity of the first extremity of the at least one comb drive assembly and a second end portion coupled to the second comb drive member in the vicinity of the second extremity of the at least one comb dive assembly.

4. A microactuator as in claim 3 wherein the at least one comb drive assembly comprises first and second comb drive assemblies, each of the first and second comb drive assemblies having such first and second comb drive members.

5. A microactuator as in claim 1 wherein the first elongate member is substantially parallel to the second elongate member.

6. A microactuator as in claim 1 wherein the second comb drive member moves to the second position in a direction substantially perpendicular to the second elongate member.

7. A microactuator as in claim 1 wherein each of the second comb drive fingers is joined to the second elongate member at a second oblique angle.

8. A microactuator as in claim 7 wherein each of the first comb drive fingers is joined to the first elongate member at a first oblique angle.

9. A microactuator as in claim 8 wherein the at least one comb drive assembly has first and second extremities and wherein the second oblique angle is inclined towards the first extremity of the at least one comb drive assembly and the first oblique angle is inclined towards the second extremity of the at least one comb drive assembly.

10. A microactuator as in claim 9 wherein the first and second oblique angles are equal.

11. A microactuator as in claim 10 wherein the first and second oblique angles are each approximately three degrees.

12. A microactuator as in claim 1 wherein each of the first and second comb drive fingers has a length and a constant width along the length.

13. An electrostatic microactuator comprising a substrate, at least one comb drive assembly having first-and second comb drive members, the first comb drive member being mounted on the substrate and the second comb drive member overlying the substrate, at least one spring member having a first end portion coupled to the substrate and a second end portion coupled to the second comb drive member, the first comb drive member having a first elongate member and a plurality of spaced-apart first comb drive fingers extending from a side of the first elongate member and facing the second comb drive member, the second comb drive member having a second elongate member and a plurality of spaced-apart second comb drive fingers extending from a side of the second elongate member and facing the first comb drive member, each of the second comb drive fingers being joined to the second elongate member at an oblique angle, the second comb drive member being movable between a first position in which the second comb drive fingers are not substantially fully interdigitated with the first comb drive fingers and a second position in which the second comb drive fingers are substantially fully interdigitated with the first comb drive fingers.

14. A microactuator as in claim 13 wherein each of the first comb drive fingers is joined to the first elongate member at the oblique angle.

15. A microactuator as in claim 13 wherein the at least one spring member comprises first and second beam-like spring members, the at least one comb drive assembly being disposed between the first and second beam-like spring members.

16. A microactuator as in claim 13 wherein the at least one comb drive assembly has first and second extremities and wherein the at least one spring member is a single beam-like member having a first end portion coupled to the substrate in the vicinity of the first extremity of the at least one comb drive assembly and a second end portion coupled to the second comb drive member in the vicinity of the second extremity of the at least one comb drive assembly.

17. An electrostatic microactuator comprising a substrate, at least one comb drive assembly having first and second extremities and first and second comb drive members, the first comb drive member being mounted on the substrate and the second comb drive member overlying the substrate, first and second beam-like spring members, the at least one comb drive assembly being disposed between the first and second beam-like spring members, each of the first and second beam-like spring members having a first end portion coupled to the substrate in the vicinity of he first extremity of the at least one comb drive assembly and a second end portion coupled to the second comb drive member in the vicinity of the second extremity of the at least one comb drive assembly, the first comb drive member having a first elongate member and a plurality of spaced-apart first comb drive fingers extending from a side of the first elongate member and joined to the first elongate member at a first oblique angle, the second comb drive member having a second elongate member and having a plurality of spaced-apart second comb drive fingers extending from a side of the second elongate member and joined to the first elongate member at a second oblique angle, the first comb drive fingers having respective spaces therebetween and the first comb drive member having a midpoint in the space between each adjacent pair of the first comb drive fingers, the second comb drive member being movable between a first position in which each second comb drive finger is not substantially fully interdigitated with an adjacent pair of first comb drive fingers and a second position in which each such second comb drive finger is substantially fully interdigitated with such adjacent pair of first comb drive fingers, each of the second comb drive fingers being offset relative to the second elongate member from the midpoint between the adjacent pair of first comb drive fingers when in the first position and being substantially centered on such midpoint when in the second position.

18. A microactuator as in claim 17 wherein the first and second oblique angles are equal.

19. A microactuator as in claim 17 wherein the first elongate member is substantially parallel to the second elongate member.

20. A microactuator as in claim 17 wherein the at least one comb drive assembly has a length and wherein each of the first and second beam-like spring members has a length approximating the length of the at least one comb drive assembly.

21. A linear electrostatic microactuator comprising a substrate, at least one comb drive assembly having first and second extremities and first and second comb drive members, the first comb drive member being mounted on the substrate and the second comb drive member overlying the substrate, first and second nonfolded bean-like spring members, the at least one comb drive assembly being disposed between the first and second spring members, each of the first and second spring members having a first end portion coupled to the substrate in the vicinity of the first extremity of the at least one comb drive assembly and a second end portion coupled to the second comb drive member in the vicinity of the second extremity of the at least one comb drive assembly, each of the first and second comb drive members being provided with comb drive fingers, the second comb drive member being movable between a first position in which the comb drive fingers of the first ad second comb drive members are not substantially fully interdigitated and a second position in which the comb drive fingers of the first and second comb drive members are substantially fully interdigitated.

22. A microactuator as in claim 21 wherein each of the first and second comb drive members has an elongate member, the respective comb drive fingers being longitudinally spaced apart along the elongate member and joined to the elongate member at an oblique angle.

23. A microactuator as in claim 22 wherein the first comb drive member has a midpoint in the space between each adjacent pair of the comb drive fingers, each of the comb drive fingers of the second comb drive member being offset relative to the elongate member of the second comb drive member from the midpoint between the adjacent pair of comb drive fingers of the first comb drive member when in the first position and being substantially centered on such midpoint when in the second position.

24. An electrostatic microactuator comprising a stationary comb drive member having a first elongate member and a plurality of spaced-apart first comb drive fingers extending from the first elongate member with respective spaces therebetween, the stationary comb drive member having an imaginary centerline extending in the space between each adjacent pair of first comb drive fingers, a movable comb drive member having a second elongate member and a plurality of spaced-apart second comb drive fingers extending from the second elongate member, the movable comb drive member being movable from a rest position to an actuated position in which the second comb drive fingers mesh with the first comb drive fingers, the second comb drive fingers being offset from the imaginary centerline when in the rest position and being substantially coincident with the imaginary centerline when in the actuated position.

25. A microactuator as in claim 24 fiber comprising at least one spring member coupled to the movable comb drive member for urging the movable comb drive member towards the rest position.

26. A microactuator as in claim 25 further comprising a voltage source coupled to the stationary and movable comb drive members for applying a voltage potential between the stationary and movable comb drive members to drive the movable comb drive member from the rest position to the actuated position.

27. A microactuator as in claim 24 wherein the first comb drive fingers extend from the first elongate member at a first oblique angle and the second comb drive fingers extend from the second elongate member at a second oblique angle.

28. A microactuator as in claim 27 wherein the first and second oblique angles are equal.

29. An electrostatic microactuator comprising a substrate, a first comb drive member mounted on the substrate and having a plurality of spaced-apart first comb drive fingers with respective spaces therebetween, the first comb drive member having an imaginary centerline extending in the space between each adjacent pair of first comb drive fingers, a second comb drive member overlying the substrate and having a plurality of spaced-apart second comb drive fingers, the second comb drive member being movable from a rest position to an actuated position in which the second comb drive fingers substantially interdigitate with the first comb drive fingers, the second comb drive fingers being offset from the imaginary centerline when in the rest position and being substantially coincident with the imaginary centerline when in the actuated position.

30. A microactuator as in claim 29 further comprising at least one spring member coupled to the second comb drive member for urging the second comb drive member towards the rest position.

31. A microactuator as in claim 29 further comprising a voltage source coupled to the first and second comb drive members for applying a voltage potential between the first and second comb drive members to drive the second comb drive member from the rest position to the actuated position.

32. An electrostatic microdevice comprising a substrate, a stationary comb drive member mounted on the substrate and having a first elongate member and a plurality of spaced-apart first comb drive fingers extending from the first elongate member with respective spaces therebetween, the stationary comb drive member having an imaginary centerline extending in the space between each adjacent pair of first comb drive fingers, a movable comb drive member overlying the substrate and having a second elongate member and a plurality of spaced-apart second comb drive fingers extending from the second elongate member, the second comb drive fingers being offset from the imaginary centerline when in a rest position relative to the first comb drive fingers.

33. A microdevice as in claim 32 wherein the first comb drive fingers extend from the first elongate member at a first oblique angle and the second comb drive fingers extend from the second elongate member at a second oblique angle.

34. A microdevice as in claim 33 wherein the first and second oblique angles are equal.

35. An electrostatic microdevice comprising a substrate, a first comb drive member mounted on the substrate and having a plurality of spaced-apart first comb drive fingers, a second comb drive member overlying the substrate and having a plurality of spaced-apart second comb drive fingers, the second comb drive member being movable from a first position to a second position in which each second comb drive finger substantially interdigitates with an adjacent pair of first comb drive fingers, each second comb drive finger being off centered relative to the adjacent pair of first comb drive fingers when in the first position and being centered with the adjacent pair of first comb drive fingers when in the second position.

36. A microdevice as in claim 35 further comprising at least one spring member coupled to the second comb drive member for supporting the second comb drive member over the substrate.

37. A microdevice as in claim 35 further comprising a voltage source coupled to the first and second comb drive members for applying a voltage potential between the first and second comb drive members to drive the second comb drive member from the first position to the second position.

38. An electrostatic microdevice comprising a substrate, a stationary comb drive member mounted on the substrate, the stationary comb drive member having a first elongate member and a plurality of spaced-apart first comb drive fingers extending from the first elongate member at a first oblique angle, a movable comb drive member overlying the substrate, the movable comb drive member having a second elongate member and a plurality of spaced-apart second comb drive fingers extending from the second elongate member at a second oblique angle, the movable comb drive member being movable from a first position to a second position in which the second comb drive fingers substantially interdigitate with the first comb drive fingers.

39. A microdevice as in claim 38 wherein the first and second oblique angles are equal.

40. A microdevice as in claim 38 further comprising a voltage source coupled to the stationary and movable comb drive members for applying a voltage potential between the stationary and movable comb drive members to drive the movable comb drive member from the first position to the second position.

* * * * *